United States Patent [19]

Ohmae et al.

[11] Patent Number: 5,405,909
[45] Date of Patent: Apr. 11, 1995

[54] THERMOPLASTIC ELASTOMER COMPOSITION

[75] Inventors: Tadayuki Ohmae; Yoshiki Toyoshima; Kentaro Mashita; Noboru Yamaguchi; Kenzo Chikanari, Chiba, all of Japan

[73] Assignee: Sumitomo Chemical Co., Ltd., Osaka, Japan

[21] Appl. No.: 147,466

[22] Filed: Oct. 26, 1993

Related U.S. Application Data

[63] Continuation of Ser. No. 774,618, Oct. 10, 1991, abandoned.

[30] Foreign Application Priority Data

Oct. 12, 1990 [JP] Japan ................................ 2-272280

[51] Int. Cl.⁶ .................. C08L 37/00; C08L 67/02
[52] U.S. Cl. ................................ 525/92 B; 525/166; 525/173; 525/175; 525/176
[58] Field of Search ................. 525/92, 173, 166

[56] References Cited

FOREIGN PATENT DOCUMENTS

| | | |
|---|---|---|
| 0237306 | 9/1987 | European Pat. Off. . |
| 0285256 | 10/1988 | European Pat. Off. . |
| 0337976 | 10/1989 | European Pat. Off. . |
| 0342067 | 11/1989 | European Pat. Off. . |
| 46-32866 | 9/1971 | Japan . |
| 61-221260 | 10/1986 | Japan . |
| 62-61067 | 12/1987 | Japan . |
| 1-501713 | 6/1989 | Japan . |
| 1208585 | 10/1970 | United Kingdom . |

OTHER PUBLICATIONS

;

*Primary Examiner*—Patricia A. Short
*Attorney, Agent, or Firm*—Cushman Darby & Cushman

[57] ABSTRACT

A thermoplastic elastomer composition which is useful for bumper, boot, sound absorbing gear, sports shoes etc. is provided by mixing the following (A)–(D).

A: 30–58 parts by wt of saturated polyester resin,
B: 42–70 parts by wt of an epoxy group-containing ethylene copolymer of
 a) 50–99% by wt of ethylene unit,
 b) 0.1–30% by wt of unsaturated carboxylic acid glycidyl ester unit or unsaturated glycidyl ether unit and
 c) 0–49% by wt of ethylenically unsaturated ester unit
C: 0.01–20 parts by wt of specific polyfunctional compound containing two or more functional groups, and
D: 1–30 parts by wt of block copolyether ester elastomer.

The amounts of C and D are based on 100 parts of A and B.

8 Claims, 1 Drawing Sheet

FIG. 1

THERMOPLASTIC ELASTOMER COMPOSITION

This is a continuation of application No. 07/774,618, filed on Oct. 10, 1991, which was abandoned upon the filing hereof.

FIELD OF THE INVENTION

The present invention relates to a novel thermoplastic elastomer composition which is flexible and tough over a wide range of temperature and excellent in appearance and in balancing of properties such as impact resistance, heat resistance, oil resistance, coatability and processability and can be used for bumper, boot, sound absorbing gear, sports shoes, tube, hose, etc. The feature of the present invention is to provide a thermoplastic elastomer which is relatively competitive in price by using as starting materials polyethylene terephthalate or polybutylene terephthalate which is produced in a large amount as engineering plastics and is available at a low price.

BACKGROUND OF THE INVENTION

Hitherto, flexible vinyl chloride resins, ethylene-vinyl acetate resins, thermoplastic urethane resins, nylon 12, polyester elastomers have been used as materials which provide hard rubber-like or leather-like molded products.

However, flexible vinyl chloride resins, ethylene-vinyl acetate resins, thermoplastic urethane resins, nylon 12, and polyester elastomers have problems and defects in low-temperature resistance, wear resistance, processability, and hydrolysis resistance and heat aging resistance, respectively. These have been obstacles to development of practical uses.

The following proposals have been made as thermoplastic elastomer compositions prepared from polyethylene terephthalate or polybutylene terephthalate which can be industrially produced in large scale and is cheaply available.

Japanese Patent Kokai No. 63-113056 has proposed compositions of saturated polyester resin and ethylene-unsaturated epoxy compound copolymer or ethylene-unsaturated epoxy compound-ethylenically unsaturated compound copolymer.

Japanese Patent Application No. 3-88836 has proposed a composition comprising three components of saturated polyester resin, epoxy group-containing ethylene copolymer and polyfunctional compound having reactivity with epoxy group, carboxyl group and hydroxyl group.

Patent Kohyo No. 1-501713 has proposed a composition of saturated polyester resin, ethylene-acrylic acid copolymer and ethylene-glycidyl methacrylate copolymer.

Properties have been considerably improved by using such three component system, but it has been demanded to further improve balancing of low-temperature impact resistance, heat resistance, oil resistance and rigidity for industrial utilization.

The object of the present invention is to provide a thermoplastic elastomer composition which is excellent in balancing of low-temperature resistance, especially impact resistance at low temperatures and rigidity and in processability maintaining heat resistance, wear resistance and chemical resistance which are characteristics of saturated polyester resins such as polyethylene terephthalate and polybutylene terephthalate used as main starting materials.

As a result of research conducted by the inventors on polyester elastomers comprising saturated polyester resin blended with epoxy group-containing ethylene copolymer, it has been found that thermoplastic elastomers for various molded products which are excellent in heat resistance, wear resistance, and chemical resistance and balancing of rigidity and low-temperature resistance, especially low-temperature impact resistance are obtained by blending a specific polyfunctional compound and a specific elastomer.

SUMMARY OF OBJECTS AND THE INVENTION

A thermoplastic elastomer composition which is useful for bumper, boot, sound absorbing gear, sports shoes etc. is provided by mixing the following (A)-(D):

A: 30-50 parts by wt of saturated polyester resin.
B: 42-70 parts by wt of an epoxy group containing ethylene copolymer of
   a) 50-99% by wt of ethylene unit,
   b) 0.1-30% by wt of unsaturated carboxylic acid glycidyl ether unit and
   c) 0-49% by wt of ethylenically unsaturated ester unit
C: 0.01-20 parts by wt of specific polyfunctional compound containing two or more functional groups, and
D: 1-30 parts by wt of block copolyether ester elastomer.

The amounts of C and D are based on 100 parts of A and B.

DETAILED DESCRIPTION OF THE INVENTION

The present invention relates to a thermoplastic elastomer composition which comprises:

totally 100 parts by weight of a mixture of (A) 30-58 parts by weight of a saturated polyester resin and (B) 42-70 parts by weight of an epoxy group-containing ethylene copolymer comprising (a) 50-99% by weight of ethylene unit, (b) 0.1-30% by weight of unsaturated carboxylic acid glycidyl ester unit or unsaturated glycidyl ether unit, and (c) 0-49% by weight of ethylenically unsaturated ester compound unit and (C) 0.01-20 parts by weight of a polyfunctional compound containing at least two identical or different functional groups selected from amino group, carboxyl group, carboxylic anhydride group, hydroxyl group and (wherein X and Y are both oxygen atoms or sulfur atoms or one of them is an oxygen atom and another is a sulfur atom) and

(D) 1–30 parts by weight of a block copolyether ester elastomer.

The saturated polyesters (A) in the present invention comprise a dicarboxylic acid component at east 40 mol % of which is terephthalic acid and a diol component. As the dicarboxylic acid component other than terephthalic acid, mention may be made of one or mixtures of aliphatic dicarboxylic acids of 2–20 carbon atoms such as adipic acid, sebacic acid and dodecanedicarboxylic acid, aromatic dicarboxylic acids such as isophthalic acid and naphthalenedicarboxylic acid, allcyclic dicarboxylic acids such as cyclohexanedicarboxylic acid. As the diol component, mention may be made of one or mixtures of aliphatic glycols and allcyclic glycols such as ethylene glycol, 1,3-propanediol, 1,4-butanediol, 1,6-hexanediol, 1,10-decanediol and 1,4-cyclohexanediol.

Among these saturated polyester resins (A), especially polybutylene terephthalate and polyethylene terephthalate exhibit desirable effect of the present invention. Furthermore, these saturated polyester resins (A) preferably have an inherent viscosity of 0.5–3.0 dl/g measured at 25° C. using o-chlorophenol as a solvent. When saturated polyester resins (A) having an inherent viscosity outside the above range are used, the desired mechanical strength is somewhat inferior.

The epoxy group-containing ethylene copolymer (B) which is a constituting component of the thermoplastic elastomer composition of the present invention is an epoxy group-containing ethylene copolymer which comprises (a) 50–99% by weight of ethylene unit, (b) 0.1–30% by weight, preferably 0.5–20% by weight of unsaturated carboxylic acid glycidyl ester unit or unsaturated glycidyl ether unit, and (c) 0–49% by weight of ethylenically unsaturated ester compound unit.

The unsaturated carboxylic acid glycidyl ester unit and unsaturated glycidyl ether unit (b) in the epoxy group-containing ethylene copolymer (B) are represented by the following formulas (1) and (2).

(1)

(R is a hydrocarbon group of 2–18 carbon atoms which has an ethylenically unsaturated bond.)

(2)

(R is a hydrocarbon group of 2–18 carbon atoms which has an ethylenically unsaturated bond and X is Examples are glycidyl acrylate, glycidyl methacrylate, glycidyl itaconate, allylglycidyl ether, 2-methylallylglycidyl ether, and styrene-p-glycidyl ether.

Furthermore, as the epoxy group-containing ethylene copolymer, there may be used ternary or higher copolymer comprising unsaturated carboxylic acid glycidyl ester or unsaturated glycidyl ether, ethylene and (c) ethylenically unsaturated ester compound. The ethylenically unsaturated compound (c) includes carboxylic acid vinyl esters such as vinyl acetate, vinyl propionate, methyl acrylate, ethyl acrylate, butyl acrylate, methyl methacrylate, ethyl methacrylate and butyl methacrylate and $\alpha,\beta$-unsaturated carboxylic acid alkyl esters. Especially preferred are vinyl acetate, methyl acrylate and ethyl acrylate.

As examples of the epoxy group-containing ethylene copolymer (B), mention may be made of copolymers comprising ethylene unit and glycidyl methacrylate unit, copolymers comprising ethylene unit, glycidyl methacrylate unit and methyl acrylate unit, copolymers comprising ethylene unit, glycidyl methacrylate unit and ethyl acrylate unit, and copolymers of ethylene unit, glycidyl methacrylate unit and vinyl acetate unit.

Melt index (JIS K6760) of the epoxy group-containing ethylene copolymers is preferably 0.5–100 g/10 rain, more preferably 2–50 g/10 min. The melt index may be outside this range, but if it is more than 100 g/10 rain, the resulting composition is not preferred in mechanical properties and if it is less than 0.5 g/10 rain, the copolymer is insufficient in compatibility with saturated polyester resin (A).

The epoxy group-containing ethylene copolymer is usually prepared by copolymerizing an unsaturated epoxy compound with ethylene in the presence of a radical former under 500–4000 arm at 100°–300° C. in the presence or absence of suitable solvent or chain transfer agent. Alternatively, it can be also prepared by adding an unsaturated epoxy compound and a radical former to polyethylene and carrying out melt graft copolymerization thereof in an extruder.

The polyfunctional compound of the component (C) includes those which have in one molecule two or more identical or different functional groups selected from amino group, carboxyl group, carboxylic anhydride group, hydroxyl group, and (wherein X and Y are both oxygen atoms or sulfur atoms or one of them is an oxygen atom and another is a sulfur atom).

The polyfunctional compound (C) has no limitation in its molecular weight and also includes polymer compounds.

Examples of the polyfunctional compound containing two or more amino groups in one molecule are shown below.

Aliphatic diamines such as 1,6-hexamethylenediamine, trimethylhexamethylenediamine, 1,4-diaminobutane, 1,3-diaminopropane, ethylene diamine and polyether diamine; aliphatic diamine carbamates such as hexamethylenediamine carbamate and ethylenediamine carbamate; aliphatic polyamines such as diethylenetriamine, triethylenetetramine, tetraethylenepentamine, pentaethylenehexamine, ethylaminoethylamine, methylaminopropylamine, 2-hydroxyethylaminopropylamine, aminoethylethanolamine, 1,3-bis(3-aminopropoxy)-2,2-dimethylpropane, 1,3,6-trisaminomethylhexane, iminobispropylamine, methyliminobispropylamine, and bis(hexamethylene)triamine; allcyclic polyamines such as menthenediamine, N-aminoethylpiperazine, 1,3-diaminocyclohexane, isophoronediamine, and bis(4-amino-3-methylcyclohexyl) methane; aliphatic polyamines having aromatic ring such as m-xylylenediamine and tetrachloro-p-xylylenediamine; aromatic amines such as m-phenylenediamine, diaminophenyl ether, 4,4′- methylenedianiline, diaminodiphenylsulfone, benzidine, 4,4'-bis(o-toluidine)-4,4'-thiodianiline, o-phenylenediamine, dianisidine, methylenebis(o-chloroaniline), 2,4-toluenediamine, bis(3,4-diaminophenyl)sulfone, diaminoditolylsulfone, 4-chloro-o-phenylenediamine, 4-methoxy-6-methyl-m-phenylenediamine, and m-aminobenzylamine; and polyamines containing silicon such as 1,3-bis(γ-aminopropyl)-1,1,3,3-tetramethyldisiloxane. Further examples are amine-modified silicone oil; butadiene-acrylonitrile copolymer in which the terminal functional group is an amine; tertiary amine compounds such as N,N,N',N'-tetramethylhexamethylenediamine and N,N,N'',N'',N''-pentamethyldiethylenetriamine; ethylene copolymers comprising ethylene unit and α,β-unsaturated carboxylic acid N,N-dialkylaminoalkyl ester unit such as copolymer of ethylene and N,N-dimethylaminoethyl methacrylate; ethylene copolymers comprising ethylene unit and N,N-dialkylaminoalkyl α,β-unsaturated carboxylic acid amide unit such as copolymer of ethylene and N,N-dimethylaminopropylacrylamide; dihydrazide compounds such as succinic dihydrazide, adipic dihydrazide, isophthalic dihydrazide, and eicosanic diacid dihydrazide; diaminomaleonitrile; and melamine. Additional examples are compounds which are generally used also as curing agents for epoxy resins such as imidazoles, e.g., 2,4,6-tris(dimethylaminomethyl) phenol and 2-ethyl-4-methylimidazole.

Examples of the compound containing two or more carboxylic anhydride groups in one molecule include ethylene copolymers comprising ethylene unit and maleic anhydride unit, copolymers comprising isobutylene and maleic anhydride, and copolymers comprising styrene and maleic anhydride. These copolymers may additionally contain α,β-unsaturated carboxylic acid alkyl ester or carboxylic acid vinyl ester as a copolymer component. For example, they may contain as a copolymer component alkyl esters of acrylic acid or methacrylic acid such as methyl acrylate, ethyl acrylate, butyl acrylate, methyl methacrylate, ethyl methacrylate and butyl methacrylate, vinyl acetate, vinyl propionate, or the like. Moreover, mention may be made of trimellitic acid anhydride, pyromellitic acid anhydride, ethylene glycol bis(anhydrotrimellitate) and the like.

Examples of the compound containing two or more hydroxyl groups in one molecule include saponification product of copolymer of ethylene and vinyl acetate, cyanuric acid, phenol novolak resin, and o-cresol novolak resin.

Examples of the compound having two or more (wherein X and Y are both oxygen atoms or sulfur atoms or one of them is an oxgen atom and another is a sulfur atom) include heterocyclic compounds, aromatic compounds and aliphatic compounds.

As examples of the heterocyclic compounds, mention may be made of parabanic acid, alloxan, alloxantin, alloxan-5-oxime, barbituric acid, 5,5-diethylbarbituric acid, 5-ethyl-5-phenylbarbituric acid, 5-(1-methylbutyl)-5-allylbarbituric acid, 5,5-diallylbarbituric acid, isocyanuric acid, and these compounds in which oxygen atom of is substituted with a sulfur atom, such as 2,4-dithiobarbituric acid and 2-thiobarbituric acid.

Examples of the aromatic compounds are pyromellitic diimide, mellitic triimide, and 1,4,5,8-naphthalic diimide and thioimides corresponding thereto.

Examples of the aliphatic compounds are triuret, 1-methyltriuret, 1,1-diethyltriuret, and tetrauret and thiourets corresponding thereto.

Examples of the compounds having two or more carboxyl groups in one molecule of the polyfunctional compound (C) are aliphatic polycarboxylic acids such as oxalic acid, succinic acid, adipic acid, azelaic acid, sebacic acid, dodecanedicarboxylic acid, carbarylic acid, cyclohexanedicarboxylic acid, and cyclopentanedicarboxylic acid; polymeric polycarboxylic acids such as ethylene-acrylic acid copolymer, ethylene-methacrylic acid copolymer, ethylene-acrylic acid-methyl acrylate copolymer, ethylene-acrylic acid-ethyl acrylate copolymer, ethylene-acrylic acid-butyl acrylate copolymer, ethylene-acrylic acid-vinyl acetate copolymer, ethylene-methacrylic acid-methyl methacrylate copolymer, ethylene-methacrylic acid-ethyl methacrylate copolymer, ethylene-methacrylic acid-butyl methacrylate copolymer, and ethylene-methacrylic acid-vinyl acetate copolymer; and aromatic polycarboxylic acids such as terephthalic acid, isophthalic acid, o-phthalic acid, naphthalenecarboxylic acid, biphenyldicarboxylic acid, trimesic acid, and trimellitic acid. Among them, aliphatic polycarboxylic acids and polymeric polycarboxylic acids are especially preferred.

The polyfunctional compounds (C) further include those which have at least one carboxyl group and at least one functional group selected from amino group, carboxylic anhydride group, hydroxyl group and (wherein X and Y are as defined above) in one molecule.

Examples of these compounds are 4-aminobutyric acid, 6-aminohexanoic acid, 12-aminododecanoic acid, 4-hydroxybutyric acid, 6-hydroxyhexanoic acid, 12-hydroxydodecanoic acid, 5-hydroxybarbituric acid, 5-aminobarbituric acid and 5-hydroxyiminobarbituric acid.

These polyfunctional compounds all may be used in combination.

The polyfunctional compounds (C) of the present invention must be those which react with epoxy group of the epoxy group-containing ethylene copolymers (B) to act as a partial crosslinking agent. That is, when saturated polyester resin (A) and epoxy group-containing ethylene copolymer (B) are melt kneaded, a morphology which comprises epoxy group-containing ethylene copolymer (B) which saturated polyester resin (A) particles are dispersed is firstly produced owing to the fact that melting point of epoxy group-containing ethylene copolymer (B) is lower than that of saturated polyester resin (A). Thereafter, polyfunctional compound (C) reacts with the epoxy group of epoxy group-containing ethylene copolymer (B) and acts as a partial crosslinking agent to cause increase in melt viscosity of the epoxy group-containing ethylene copolymer (B) phase. As a result, phase inversion occurs to produce a multiple dispersion state in which epoxy group-containing ethylene copolymer (B) phase containing saturated polyester resin (A) particles therein is dispersed in saturated polyester resin (A) matrix phase. This dispersion state resembles that of impact-resistant polystyrene and forms morphology of so-called salami structure or sub-inclusion structure and this is considered to be a dispersion state which creates the best properties.

It is sometimes preferred to use a reaction accelerator in order to accelerate the reaction of polyfunctional compound (C) with epoxy group-containing ethylene copolymer (B). A compound selected from quaternary ammonium salts, quaternary phosphonium salts and phosphines can be used as the reaction accelerator. It is preferred to use the reaction accelerator especially when a compound having carboxyl group or is used as the polyfunctional compound.

Examples of the quaternary ammonium salts are tetrabutylammonium bromide, n-dodecyltrimethylammonium bromide, and octadecyltrimethylammonium bromide. Examples of the quaternary phosphonium salts are triphenylbenzylphosphonium chloride, triphenylbenzylphosphonium iodide and tetrabutylphosphonium bromide. Examples of the phosphines are triphenylphosphine and tri-2,6-dimethoxyphenylphosphine.

Amount of the reaction accelerator is 0-5 parts by weight. Even if the amount is increased to more than 5 parts by weight, increase of effect cannot be expected.

The block copolyether ester elastomers of components (D) are block copolymers of a high-melting point hard segment mainly composed of alkylene terephthalate unit and a low-melting point soft segment comprising aliphatic polyether.

The high-melting point hard segments mainly composed of alkylene terepnthalate unit include those which are mainly composed of a unit comprising terephthalic acid or dimethyl ester thereof and an alkylene glycol such as ethylene glycol, propylene glycol, tetramethylene glycol, pentamethylene glycol, or hexamethylene glycol. In some cases, they may contain a small amount of aromatic, alicyclic or aliphatic dicarboxylic acids such as isophthalic acid, naphthalenedicarboxylic acid, 1,4-cyclohexanedicarboxylic acid, adipic acid and sebacic acid as dicarboxylic acid and glycols such as p-xylylene glycol and cyclohexane dimethanol.

As poly(alkyleneoxide) glycols which constitute the low-melting point soft segments comprising aliphatic polyethers as another component of the block copolyether ester elastomers, mention may be made of single glycols such as poly(ethylene oxide) glycol, poly(propylene oxide) glycol, and poly(tetramethylene oxide) glycol, copolyglycols such as polyglycols of random or block copolymers of ethylene oxide and propylene oxide and polyglycols of random or block copolymers of tetrahydrofuran and 2,2-dimethyloxetane, and mixtures of these glycols.

Number-average molecular weight of the poly(alkylene oxide) glycol is 400-6000. If it is more than 6000, the poly(alkylene oxide) glycol unit per se is crystalline and does not contribute to improvement of impact resistance and if it is less than 400, it does not contribute to improvement of impact resistance.

The poly(alkylene oxide) glycol component is usually contained in an amount of 10-80% by weight in the block copolyether ester elastomer. If the content is more than 80% by weight, properties of the hard segment of the elastomer almost disappear to cause deterioration of compatibility with polyethylene terephthalate type polyesters or polybutylene terephthalate type polyesters. If the content is less than 10% by weight, compatibility with epoxy group-containing ethylene copolymers is inferior because amount of the poly(alkylene oxide) glycol unit is small and thus, it does not contribute to improvement of impact resistance.

Preferred examples of the block copolyether ester elastomers (D) are the elastomers in which at least 60 mol % of the alkylene terephthalate unit in the hard segment component comprises polybutylene terephthalate unit and the aliphatic polyether in the soft segment component is poly(tetramethylene oxide) glycol.

The block copolyether ester elastomers (D) of the present invention can be prepared by known processes mentioned, for example, in Japanese Patent Kokoku No. 60-16454. They include a process of direct esterification of terephthalic acid, a low-molecular weight diol and a poly(alkylene oxide) glycol and a process of carrying out ester exchanging reaction of a dialkyl terephthalate and a low-molecular weight diol, followed by adding a poly(alkylene oxide) glycol to carry out polycondensation. If necessary, catalysts for acceleration of the reaction, various stabilizers, modifiers, pigments and the like can be used for preparation of the elastomers.

These block copolyether ester elastomers are widely produced in industrial scale and an example is one which is sold in the name of PELPRENE by Toyoho Co., Ltd.

The thermoplastic elastomer composition in the present invention contain 30-58 parts by weight of polyester resin (A) and 42-70 parts by weight of epoxy group-containing ethylene copolymer (B). In more preferred composition are contained 35-58 parts by weight of saturated polyester resin (A) and 42-65 parts by weight of epoxy group-containing ethylene copolymer (B). If content of the saturated polyester resin is less than 30 parts by weight, heat resistance and oil resistance of the composition are insufficient. If it is more than 58 parts by weight, the composition is inferior in rigidity, low-temperature resistances, especially low-temperature impact resistance and flexibility.

Addition amount of polyfunctional compound (C) is 0.01-20 parts by weight based on totally 100 parts by weight of saturated polyester resin (A) and epoxy group-containing ethylene copolymer (B). If it is less than 0.01 part by weight, the effect to improve mechanical properties such as impact resistance is not satisfactory and if it is more than 20 parts by weight, no further effect is obtained.

Amount of the block copolyether ester of component (D) is 1-30 parts by weight based on totally 100 parts by weight of (A) and (B). If it is less than 1 part by weight, improvement of impact resistance and others is insufficient and if it is more than 30 parts by weight, no additional effect is recognized.

The thermoplastic elastomer of the present invention can be produced by melt kneading the components in molten state. Saturated polyester resin (A), epoxy group-containing ethylene copolymer (B), polyfunctional compound (C) and block copolyether ester elastomer (D) can be simultaneously melt kneaded to obtain the thermoplastic elastomer. However, more preferably, saturated polyester resin (A), epoxy group-containing ethylene copolymer (B) and the reaction accelerator are melt kneaded and then the resulting composition is melt kneaded with polyfunctional compound (C) and block copolyether ester elastomer (D) in a later stage because the reaction product of saturated polyester resin (A) and epoxy group-containing ethylene copolymer (B) which acts as a compatibilizing between saturated polyester resin component (A) and epoxy group-containing ethylene copolymer (B) is produced in a larger amount in the latter process than in the former process.

Properties such as impact resistance can be further improved by the addition of block copolyether ester elastomer (D) in the present invention. This will be for the following reason.

The high-melting point hard segment mainly composed of alkylene terephthalate unit has good compatibility with saturated polyester resin (A) and the low-melting point soft segment comprising aliphatic polyether has good compatibility with epoxy group-containing ethylene copolymer (B). As a result, block copolyether ester elastomer (D) is present in the form of a membrane at the interface between epoxy group-containing ethylene copolymer (B) particles and saturated polyester resin (A) matrix, resulting in flexible strong bond between the particles and the matrix. This has been confirmed by observation under an electron microscope of morphology of the composition of the present invention and of rupture cross-section in low-temperature impact test of the composition of the present invention. Area of the region which constitutes the nucleus of rupture in the rupture cross-section increases and voids produced by rupture decreases due to the addition of block copolyether ester elastomer (D).

For melt kneading of the components, there may be used kneading apparatuses generally employed such as single or twin-screw extruders and other extruders, Banbury mixer, rolls, and various kneaders.

For production of the thermoplastic elastomer by adding polyfunctional compound (C) and block copolyether ester elastomer (hereinafter referred to as "elastomer") to components (A) and (B) and melt kneading them, a melt kneaded composition of saturated polyester resin (A) and epoxy group-containing ethylene copolymer is once pelletized, for example, by an extruder and then, thereto are added polyfunctional compound (C) and elastomer (D) and these are again melt kneaded by an extruder. However, preferably, using an extruder with a side feeder, a melt kneaded composition of saturated polyester resin (A) and epoxy group-containing ethylene copolymer (B) is produced in the front portion (feeding side) of the extruder and polyfunctional compound (C) and elastomer (D) in solid state, molten state or liquid state are fed from the side feeder in the rear portion (discharging side) of the same extruder and melt kneaded with the composition of (A) and (B).

Furthermore, it is also preferred to previously prepare a master batch by melt kneading polyfunctional compound (C) with a resin inert to the polyfunctional compound (C) and feed it in a suitable amount at the time of preparing the thermoplastic elastomer composition of the present invention. Elastomer (D) can be used as the inert resin.

Before kneading, it is preferable to uniformly mix respective resin components in the form of powder or pellets in a tumbler or a Henschel mixer. However, each resin may be separately fed directly to a kneading apparatus through a metering device without mixing.

The thermoplastic elastomer composition of the present invention may further contain other components, for example, additives such as pigment, dye, reinforcing agent, filler, heat stabilizer, antioxidant, weathering agent, nucleating agent, antistatic agent, flame retardant, and plasticizer or other polymers as far as processability and properties of the composition are not damaged. Especially when reinforcing agents or fillers such as glass fibers, carbon fibers, talc, calcium carbonate and magnesium hydroxide which are subjected to various surface treatments are added to the thermoplastic elastomer composition of the present invention, extremely useful materials high in impact resistance can be obtained.

The thermoplastic elastomer composition of the present invention is molded by various methods such as injection molding, extrusion molding and the like.

Flexural modulus (JIS K7203) of molded products obtained by molding the thermoplastic elastomer composition of the present invention is preferably 500–15000 kg/cm$^2$.

The object of the present invention is to provide a flexible and tough thermoplastic elastomer which can be used for automobile parts such as bumper, daily necessaries such as sports shoes and work shoes and mechanical components such as tube and hose, and flexural modulus thereof is suitably 500–15000 kg/cm$^2$.

A flexural modulus of less than 500 kg/cm$^2$ is too soft for molded products and they are not suitable for the uses aimed at by the present invention. If the flexural modulus is more than 15000 kg/cm$^2$, rigidity is too high and the products are not suitable for the desired uses.

EXAMPLE

The present invention will be illustrated by the following nonlimiting examples.

1. Starting materials

In examples and comparative examples, the following were used as saturated polyester resin (A), epoxy group-containing ethylene copolymer (B), polyfunctional compound (C), block copolyether ester elastomer (D), reaction accelerator (R) and master batch diluent (M).

(A) Saturated polyester resin
① Polybutylene terephthalate (PBT) DURANEX 200FP (manufactured by Polyplastic Co.) IV=0.6 dl/g
② Polyethylene terephthalate (PET) RECYCLE PET (manufactured by FUJITECH INC.) IV=0.6 dl/g (B) Epoxy group-containing ethylene copolymer
① Copolymer (1) E/GMA/MA=60/7/33% by weight MI=33 g/10 min (190° C., 2160 g)
② Copolymer (2) E/GMA/EA=63/6/31% by weight MI=7 g/10 min (190° C., 2160 g)
③ Copolymer (3) E/GMA/MA=69/3/28% by weight MI=4 g/10 rain (190° C., 2160 g)
④ Copolymer (4) E/GMA=94/6% by weight MI=3 g/10 min (190° C., 2160 g)

⑤ Copolymer (5) E/GMA/MA=50/3/47% by weight MI=9 g/10 min (190° C., 2160 g)

(C) Polyfunctional compound
① Adipic acid
② Isocyanuric acid
③ EAA
 Copolymer prepared by high-pressure radical copolymerization method E/AA=80/20% by weight, MI=250 g/10 min (190° C., 2160 g)
④ Compound (1)
 Copolymer prepared by high-pressure radical copolymerization method E/MAH/EA=72/3/25% by weight MI=35 g/10 rain (190° C., 2160 g)
⑤ Hexamethylenediamine carbamate
⑥ 12-aminododecanoic acid (D) Block copolyether ester elastomer Polytetramethylene glycol polybutylene terephthalate block copolymer (manufactured by Toyobo Co., Ltd.) PELPRENE P-30B MI=14 g/10 min (190° C., 2160 g) PELPRENE P-40H MI=10 g/10 rain (190° C., 2160 g) PELPRENE P-70B MI=20 g/10 rain (190° C., 2160 g)

(R) Reaction accelerator
① ODA (Octadecyltrimethylammonium bromide (M) Master batch diluent
② ACRYFT WH 303 (manufactured by Sumitomo Chemical Co., Ltd.) A copolymer prepared by high-pressure radical copolymerization method E/MMA=82/18% by weight, MI=7 g/10 min (190° C., 2160 g)

Abbreviations in the above have the following meanings:
E: Ethylene, GMA: Glycidyl methacrylate,
MA: Methyl acrylate, MAH: Maleic anhydride,
MMA: Methylmethacrylate, EA: Ethyl acrylate,
AA: Acrylic acid, MI: Melt index, IV: Inherent viscosity 2. Method of melt kneading:

1) Steps of melt kneading:

Melt kneading was carried out in the order as shown in Tables 1-2. Details of kneading steps indicated by abbreviation are explained below.

A means saturated polyester resin, B means epoxy group-containing ethylene copolymer, C means polyfunctional compound, D means block copolyether ester elastomer, R means reaction accelerator, and M means diluent for master batch of polyfunctional compound.

(—) and [—] mean melt kneading. ↑ means "the same as above".

[(A+B+R)+(C+D)] means melt kneading a melt kneaded composition of A, B and R with a melt kneaded composition of C and D.

[(A+B+R)+(C+M)] means melt kneading a melt kneaded composition of A, B and R with a melt kneaded composition of C and M.

C(A+B)+(C+D+M)] means melt kneading a melt kneaded composition of A and B with a melt kneaded composition of C, D and M.

[(A+B)+(C+D)] means melt kneading a melt kneaded composition of A and B with a melt kneaded composition of C and D.

E(A+B)+(C+M)] means melt kneading a melt kneaded composition of A and B with a melt kneaded composition of C and M.

[(A+B)+C+D] means melt kneading a melt kneaded composition of A and B with C and D.

[(A+B)+D] means melt kneading a melt kneaded composition of A and B with D.

(A+B+C+D) means simultaneously melt kneading A, B, C and D.

(A+B+C) means simultaneously melt kneading A, B, and C.

(A+B+R+C+D) means simultaneously melt kneading A, B, R, C and D.

2) Method for preparing a master batch of polyfunctional compound (C):

(C+D), (C+M) and (C+D+M) were carried out in the following manner.

Respective components shown in Tables 1-2 were melt kneaded using a vented 30 mmφ single screw extruder at 200° C. to prepare a master batch.

3) Method for producing thermoplastic elastomer composition:

① Multi-stage melt kneading method (1):
[(A+B+R)+(C+D)], i(A+B+R)+(C+M)],
[(A+B)+(C+D+M)], [(A+B)+(C+D)],
[(A+B)+(C+M)], [(A+B)+C+D], and
[(A+B)+D] were carried out in the following manner.

Using a vented 30 mmφ twin screw extruder with a side feeder (TEX 30 manufactured by Japan Steel Works, Ltd., L/D=40), while melt kneading saturated polyester resin (A) and epoxy group-containing ethylene copolymer (B) and if necessary, reaction accelerator (R) shown in Tables 1-2, a master batch of polyfunctional compound (C) shown in Tables 1-2 or respective components were fed by the side feeder provided in the middle of extruder barrel through a metering device and melt kneaded with the above melt kneaded composition to obtain the thermoplastic elastomer composition. Temperature of the extruder was 260° C. for PBT or 270° C. for PET.

② Simultaneous melt kneading method:
(A+B+C+D), (A+B+C) and (A+B+R+C+D) were carried out in the following manner.

Respective components shown in Tables 1-2 were simultaneously melt kneaded using the same 30 mmφ twin screw extruder as used in multi-stage melt kneading method to obtain the thermoplastic elastomer composition. Temperature of the extruder was 260° C. for PBT.

3. Measurement of properties

Test pieces for measurement of properties were prepared for the thermoplastic elastomer compositions obtained above by drying the compositions at 120° C. for 3 hours and then carrying out injection molding by a 10 ounce injection molding machine (Toshiba IS-150-V) at a cylinder temperature of 260° C. and a mold temperature of 60° C. for polybutytene terephthalate composition or at a cylinder temperature of 280° C. and a mold temperature of 70° C. for polyethylene terephthalate composition.

Measurement of the properties in the examples was conducted by the following methods.

Heat distortion resistance (heat sag) was determined by measuring amount of deflection when sample was held by contilever and left to stand in a hot-air oven at 100° C. for 2 hours (shape of sample: 100×20×2 mm).

Flexural modulus was measured in accordance with JIS K7203 (sample thickness: 2 mm).

Tensile yield strength and elongation at rupture were measured in accordance with JIS K6301 (sample thickness: 2 mm).

Izod impact strength was measured in accordance with JIS K7110 (sample thickness: 4 mm with V notch, measuring temperature: −40° C.). NB indicates that the test piece did not ruptured even under more than 50 kg.cm/cm.

Oil resistance was determined by measuring increment in weight when sample was dipped in lubricating oil No. 3 at 70° C. for 22 hours in accordance with JIS K6301.

4. Results of measurement:

Results of measurement of properties in Examples and Comparative Examples are shown in Tables 1-2. Low-temperature impact resistance could be highly improved without deterioration of other properties by adding the block copolyether ester elatomer.

TABLE 1-1

| No. | (A) Polyester | (B) Copolymer | (R) Reaction accelerator | (C) Polyfunctional compound | (D) Elastomer | (M) Master batch diluent |
|---|---|---|---|---|---|---|
| Example 1 | PBT 50 | Copolymer (1) 50 | None | Adipic acid 0.5 | P-70B 2 | ACRYFT WH303 7.5 |
| Example 2 | ↑ | ↑ | None | ↑ | P-70B 5 | ACRYFT WH303 4.5 |
| Example 3 | ↑ | ↑ | None | ↑ | P-70B 9.5 | None |
| Example 4 | PBT 40 | ↑ | None | ↑ | P-70B 20 | None |
| Example 5 | PBT 50 | ↑ | None | ↑ | P-70B 9.5 | None |
| Comparative Example 1 | PBT 50 | Copolymer (1) 50 | None | Adipic acid 0.5 | None | ACRYFT WH303 9.5 |
| Comparative Example 2 | ↑ | ↑ | None | ↑ | None | None |
| Example 6 | PBT 50 | ↑ | ODA 0.1 | Isocyanuric acid 0.5 | P-70B 9.5 | None |
| Comparative Example 3 | ↑ | ↑ | ↑ | ↑ | None | ACRYFT WH303 9.5 |
| Example 7 | PBT 40 | Copolymer (1) 60 | ↑ | ↑ | P-70B 9.5 | None |
| Example 8 | ↑ | ↑ | ↑ | ↑ | ↑ | None |
| Comparative Example 4 | ↑ | ↑ | ↑ | ↑ | None | ACRYFT WH303 9.5 |
| Example 9 | ↑ | ↑ | None | EAA 5 | P-70B 9.5 | None |
| Example 10 | ↑ | ↑ | None | compound(1) 5 | ↑ | None |

TABLE 1-2

| No. | Melt Kneading method (−),[−]: melt kneading | Heat distortion resistance 100° C. × 2 hr (mm) | Flexural modulus (Kg/cm²) | Tensile Properties Strength at rupture (Kg/cm²) | Elongation at rupture (%) |
|---|---|---|---|---|---|
| Example 1 | [(A + B) + (C + D + M)] | 10 | 4400 | 210 | 280 |
| Example 2 | ↑ | 9 | 4100 | 230 | 280 |
| Example 3 | [(A + B) + (C + D)] | 7 | 5600 | 230 | 300 |
| Example 4 | ↑ | 7 | 4100 | 240 | 310 |
| Example 5 | (A + B + C + D) | 5 | 6000 | 210 | 300 |
| Comparative Example 1 | [(A + B) + (C + M)] | 10 | 5500 | 190 | 250 |
| Comparative Example 2 | (A + B + C) | 6 | 6100 | 240 | 250 |
| Example 6 | [(A + B + R) + (C + D)] | 7 | 5700 | 220 | 280 |
| Comparative Example 3 | [(A + B + R) + (C + M)] | 9 | 5300 | 200 | 250 |
| Example 7 | [(A + B + R) + (C + D)] | 10 | 3000 | 200 | 300 |
| Example 8 | (A + B + R + C + D) | 7 | 3800 | 220 | 300 |
| Comparative Example 4 | [(A + B + R) + (C + M)] | 9 | 2900 | 190 | 240 |
| Example 9 | [(A + B) + C + D] | 8 | 3200 | 180 | 250 |
| Example 10 | ↑ | 9 | 3200 | 170 | 230 |

TABLE 1-3

| No. | Izod impact strength −40° C., V notch (Kg · cm/cm) | Oil resistance, Oil No. 3 70° C., 22 hr (%) |
|---|---|---|
| Example 1 | 17 | 14 |
| Example 2 | 30 | 11 |
| Example 3 | NB | 6 |
| Example 4 | NB | 6 |
| Example 5 | NB | 5 |
| Comparative Example 1 | 4 | 11 |
| Comparative Example 2 | 5 | 6 |
| Example 6 | NB | 4 |
| Comparative | 3 | 12 |

TABLE 1-3-continued

| No. | Izod impact strength −40° C., V notch (Kg · cm/cm) | Oil resistance, Oil No. 3 70° C., 22 hr (%) |
|---|---|---|
| Example 3 | | |
| Example 7 | NB | 6 |
| Example 8 | NB | 5 |
| Comparative Example 4 | 3 | 13 |
| Example 9 | 30 | 8 |
| Example 10 | 21 | 11 |

TABLE 2-3-continued

| No. | Izod impact strength −40° C., V notch (Kg · cm/cm) | Oil resistance, Oil No. 3 70° C., 22 hr (%) |
|---|---|---|
| Example 12 | 20 | 11 |
| Example 13 | NB | 5 |
| Comparative Example 5 | 3 | 12 |
| Example 14 | NB | 4 |
| Example 15 | NB | 5 |
| Example 16 | NB | 4 |
| Example 17 | NB | 8 |
| Example 18 | NB | 7 |

TABLE 2-1

| No. | (A) Polyester | (B) Copolymer | (R) Reaction accelerator | (C) Polyfunctional compound | (D) Elastomer | (M) Master batch diluent |
|---|---|---|---|---|---|---|
| Example 11 | PBT 40 | copolymer (1) 60 | None | Hexamethylenediamine carbamate 0.5 | P-70B 9.5 | None |
| Example 12 | ↑ | ↑ | ODA 0.1 | 12-Aminododecanoic acid 0.5 | ↑ | None |
| Example 13 | ↑ | Copolymer (2) 60 | ↑ | Isocyanuric acid 0.5 | ↑ | None |
| Comparative Example 5 | ↑ | ↑ | ↑ | ↑ | None | ACRYFT WH303 9.5 |
| Example 14 | PBT 40 | Copolymer (3) 60 | ODA 0.1 | ↑ | P-70B 9.5 | None |
| Example 15 | ↑ | Copolymer (4) 60 | ↑ | ↑ | ↑ | None |
| Example 16 | ↑ | Copolymer (5) 60 | ↑ | ↑ | ↑ | None |
| Example 17 | PBT 50 | Copolymer (1) 50 | ↑ | ↑ | P-30B 9.5 | None |
| Example 18 | ↑ | ↑ | ↑ | ↑ | P-40H 9.5 | None |
| Comparative Example 6 | ↑ | ↑ | None | None | P-70B 10 | None |
| Example 19 | PET 50 | Copolymer (1) 50 | ODA 0.1 | Isocyanuric acid 0.5 | P-70B 9.5 | None |
| Comparative Example 7 | ↑ | ↑ | ↑ | Isocyanuric acid 0.5 | None | ACRYFT WH303 9.5 |

TABLE 2-2

| No. | Melt Kneading method (−),[−]: melt kneading | Heat distortion resistance 100° C. × 2 hr (mm) | Flexural modulus (Kg/cm²) | Tensile Properties Strength at rupture (Kg/cm²) | Elongation at rupture (%) |
|---|---|---|---|---|---|
| Example 11 | [(A + B) + (C + D)] | 9 | 3000 | 170 | 240 |
| Example 12 | [(A + B + R) + (C + D)] | 8 | 3200 | 170 | 250 |
| Example 13 | [(A + B + R) + (C + D)] | 9 | 3200 | 210 | 320 |
| Comparative Example 5 | [(A + B + R) + (C + M)] | 10 | 2900 | 190 | 250 |
| Example 14 | [(A + B + R) + (C + D)] | 7 | 3500 | 170 | 270 |
| Example 15 | ↑ | 8 | 3200 | 180 | 260 |
| Example 16 | ↑ | 15 | 2500 | 160 | 290 |
| Example 17 | ↑ | 8 | 6000 | 180 | 280 |
| Example 18 | ↑ | 8 | 5900 | 200 | 350 |
| Comparative Example 6 | [(A + B) + D)] | 35 | 3000 | 135 | 200 |
| Example 19 | [(A + B + R) + (C + D)] | 36 | 5900 | 240 | 280 |
| Comparative Example 7 | [(A + B + R) + (C + M)] | 37 | 5100 | 180 | 170 |

TABLE 2-3

| No. | Izod impact strength −40° C., V notch (Kg · cm/cm) | Oil resistance, Oil No. 3 70° C., 22 hr (%) |
|---|---|---|
| Example 11 | 21 | 11 |
| Comparative Example 6 | 8 | 25 |
| Example 19 | 20 | 3 |
| Comparative Example 7 | 4 | 18 |

5. Results of observation under electron microscope

Figure 1:
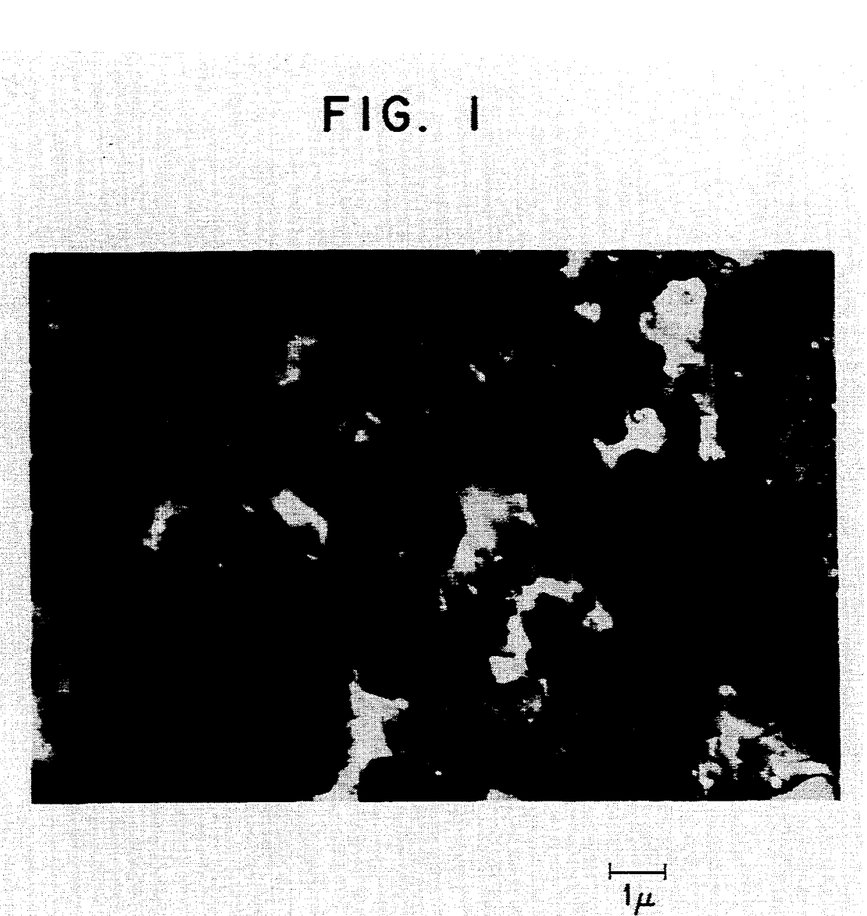
FIG. 1 is an photograph of ×9000 which shows section of a molded product obtained from the composition of Example 3 mentioned below which is observed under a transmittance type electron microscope. This photograph shows particle structure of epoxy group-containing ethylene copolymer.

FIG. 1 shows a transmittance electron microscope photograph of ultra-thin test piece obtained from the composition of Example 3. It is seen that block copolyether ester elastomer (D) is present in the form of membrane at interface of epoxy group-containing ethylene copolymer (B) particles and saturated polyester resin (A).

The thermoplastic elastomer composition of the present invention is superior in balancing of properties of molded products such as mechanical properties and thermal properties and is further superior in appearance.

The conspicuous improvement of low-temperature impact resistance attained by the addition of block copolyether ester elastomer results from skilful utilization of difference in compatibility of hard segment and that of soft segment of the elastomer. This is unexpectable result.

Moreover, the novel and flexible thermoplastic elastomer composition provided by the present invention can be easily molded into shaped articles, films, sheets, etc. by molding methods employed for usual polyester elastomers such as injection molding and extrusion molding and the molded products are excellent in balancing of properties such as heat resistance, wear resistance, flexibility, impact resistance and chemical resistance and uniformity and smoothness of appearance.

We claim:

1. A thermoplastic elastomer composition which comprises:

totally 100 parts by weight of (A) 30–58 parts by weight of at least one member selected from the group consisting of polyethylene terephthalate and polybutylene terephthalate and (B) 42–70 parts by weight of an epoxy group-containing ethylene copolymer comprising (a) 50–99% by weight of ethylene units, (b) 0.1–30% by weight of unsaturated carboxylic acid glycidyl ester units or unsaturated glycidyl ether units, and (c) 0–49% by weight of ethylenically unsaturated ester compound unit and obtained by copolymerizing (a), (b), and (c) in the presence of a radical former under a pressure of 500–4000 atm and at a temperature of 100°–300° C.;

(C) 0.01–20 parts by weight of a polyfunctional compound containing at least two identical or different functional groups selected from an amino group, a carboxyl group, a carboxylic anhydride group, a hydroxyl group and a wherein X and Y are both oxygen atoms or sulfur atoms or one of them is an oxygen atom and another is a sulfur atom; and (D) 1–30 parts by weight of a polytetramethylene glycol polybutylene terephthalate block copolymer.

2. A thermoplastic elastomer composition according to claim 1, wherein the polyfunctional compound of component (C) is an aliphatic diamine carbamate.

3. A thermoplastic elastomer composition according to claim 1, wherein the polyfunctional compound of component (C) is ethylene copolymer comprising ethylene unit and $\alpha,\beta$-unsaturated carboxylic acid N,N-dialkylaminoalkyl ester unit or ethylene unit and $\alpha,62$ -unsaturated carboxylic acid N,N-dialkylaminoalkylamide unit.

4. A thermoplastic elastomer composition according to claim 1, wherein the polyfunctional compound of component (C) is ethylene copolymer comprising ethylene unit, $\alpha,\beta$-unsaturated carboxylic acid alkyl ester unit and maleic anhydride unit.

5. A thermoplastic elastomer composition according to claim 1, wherein the compound having $$-\underset{\underset{X}{\|}}{C}-\underset{\underset{H}{|}}{N}-\underset{\underset{Y}{\|}}{C}-\ \text{unit}$$

of the polyfunctional compound of comet portent (C) is a heterocyclic compound.

6. A thermoplastic elastomer composition according to claim 1, wherein the polyfunctional compound of component (C) is a dicarboxylic acid.

7. A thermoplastic elastomer composition according to claim 1, wherein the polyfunctional compound of component (C) is ethylene copolymer comprising ethylene unit and $\alpha,\beta$-unsaturated carboxylic acid unit or ethylene copolymer comprising unsaturated carboxylic acid alkyl ester unit in addition to the two units above.

8. A thermoplastic elastomer composition according to claim 1, wherein the polyfunctional compound of component (C) comprises carboxyl group and amino group.

* * * * *